(12) United States Patent
Giagni, Sr. et al.

(10) Patent No.: US 9,045,000 B1
(45) Date of Patent: Jun. 2, 2015

(54) TIRE CHANGING APPARATUS

(71) Applicants: Vincent A. Giagni, Sr., Purchase, NY (US); Michael C. Piazza, Campton, NH (US)

(72) Inventors: Vincent A. Giagni, Sr., Purchase, NY (US); Michael C. Piazza, Campton, NH (US)

( * ) Notice: Subject to any disclaimer, the term of this patent is extended or adjusted under 35 U.S.C. 154(b) by 0 days.

(21) Appl. No.: 14/121,444

(22) Filed: Sep. 8, 2014

(51) Int. Cl.
*B60B 29/00* (2006.01)
*B66F 7/24* (2006.01)

(52) U.S. Cl.
CPC ............. *B60B 29/001* (2013.01); *B60B 29/002* (2013.01); *B66F 7/243* (2013.01)

(58) Field of Classification Search
CPC .............. B66F 1/06; B66F 5/00; B66F 7/605; B66F 7/243; B66F 9/127
USPC ...................... 254/88, 93 R, 134, 133 R, 93 L
See application file for complete search history.

(56) References Cited

U.S. PATENT DOCUMENTS

| 4,886,243 | A | * | 12/1989 | Trumbull | 254/88 |
| 5,165,273 | A | * | 11/1992 | Church | 73/146 |
| 5,855,359 | A | * | 1/1999 | Chipperfield | 254/88 |
| 6,098,961 | A | * | 8/2000 | Gionet | 254/122 |
| 6,173,941 | B1 | * | 1/2001 | Johnston | 254/89 H |
| 2001/0023939 | A1 | * | 9/2001 | Smith et al. | 254/88 |
| 2001/0038094 | A1 | * | 11/2001 | Lundy et al. | 254/1 |

* cited by examiner

*Primary Examiner* — Lee D Wilson

(57) ABSTRACT

A tire changing device is disclosed which comprises a tire support tray having two spaced apart adjacent parallel slots in the mid-section of the tray and a rotating cylindrical roller located in each slot. An incline plate is hingedly connected to the tire support table which plate also has two spaced apart adjacent parallel slots which when the incline plate is rotated and rolled on the tire support plate the two slots in the tray and the two slots in the incline table mate with the surface of the two rollers protruding above the surface of the tire table. A telescoping rim capture rod extend upward from the tire tray and terminates in a horizontal hook for retaining the tire securely in place. The tire to be changed is rolled up the incline plate onto the tire tray and is secured between the two surfaces of the rollers. After the tire change, the tire is rolled down the incline plate and into storage away from the tire changing device.

9 Claims, 7 Drawing Sheets

TIRE CHANGING APPARATUS

FIELD OF INVENTION

This invention relates generally to an apparatus for changing tires such as car and truck tires and is particularly related to such apparatus and system for changing tires in vehicles safely and efficiently.

BACKGROUND OF THE INVENTION

It is a matter of common experience that changing and installation of automobile tires can be physically demanding and this task is even more exhausting in case of larger tires such as those used on some SUV's. In order to replace a flat or damaged tire with a new tire the vehicle must be lifted above the ground, the damaged tire removed and the replacement tire lifted and rotated to the proper level and alignment to be mounted on the hub.

The difficulties and problems associated with removal of flat or damaged tires and replacing them with a new tire have received considerable attention in the prior art. For example, U.S. Pat. No. 7,367,546 issued to Roman M. Rodriguez on May 6, 2006 discloses using a tire jack for lifting a spare tire to the proper level for installation.

U.S. Pub. No. 2011/0203091 A1 published Aug. 25, 2001 describes a tire changing device for lifting and positioning the tire at the desired level.

U.S. Pat. No. 7,188,657 B2 issued to Dido Bond on Mar. 13, 2007 discloses a machine for fitting and removing vehicle wheel tires.

U.S. Pat. No. 8,371,485 B1 issued to Stephan Rosenplanter on Feb. 12, 2013 discloses a spare tire holder and installation for a vehicle.

Notwithstanding the aforementioned patents and other prior art patents, there is still a dire need for efficient and simple tire change which is less arduous to use than the devices which are presently available.

It is therefore an object of the present invention to provide a device for changing and installing tires for vehicles such as cars and SUV's.

It is also an object of this invention to provide a device for removal of damaged tires from a vehicle and replacing it with a replacement tire which does not require lifting the tire, some of which may be heavy to handle when raised to an elevated level in order to accomplish the change.

It is a further object of the present invention to provide a device for changing and replacing tires which is less time consuming and less strenuous than using the devices which have heretofore been available.

The foregoing and other advantageous features of the present invention will be more fully described and appreciated from the following detailed description and the accompanying drawings.

SUMMARY OF THE INVENTION

The present invention provides a tire changing device for automobiles which is effective and convenient to use. The device basically comprises a tire support tray having two spaced apart parallel slots in the middle of the tray and a rotating cylindrical roller in each slot, an incline plate which is hingedly connected to the tire tray and which also has a\two spaced apart parallel slots which can be rotated and rolled onto the tire tray with the slots in the incline plate mate with the slots in the tire tray. The surface of each roller protrudes slightly above the tray so that the working tire can be secured between the surface of the two rollers when the tire is moved from the bottom of the incline tray up the incline plate and onto the tire table. Secured to one side of the tire table is a telescoping rim capture rod extending vertically upward from the tire tray and terminating in a horizontally extending capture hook which serves to retain the tire in a secured position during tire changing operation. The telescoping rim capture rod has a lower section secured to the tire tray and an upper section which is telescopically received by the lower section and which can be raised to a desired height and terminates at its upper end with a horizontal hook member for retaining the tire securely in position. The tire changing device also utilities a guide tube for guiding the wheel lug nut of the tire into position on the tire lug nut stud.

BRIEF DESCRIPTION OF THE DRAWINGS

In the drawings wherein like reference numerals are used to designate like parts.

DETAILED DESCRIPTION OF THE INVENTION

Figure 1:
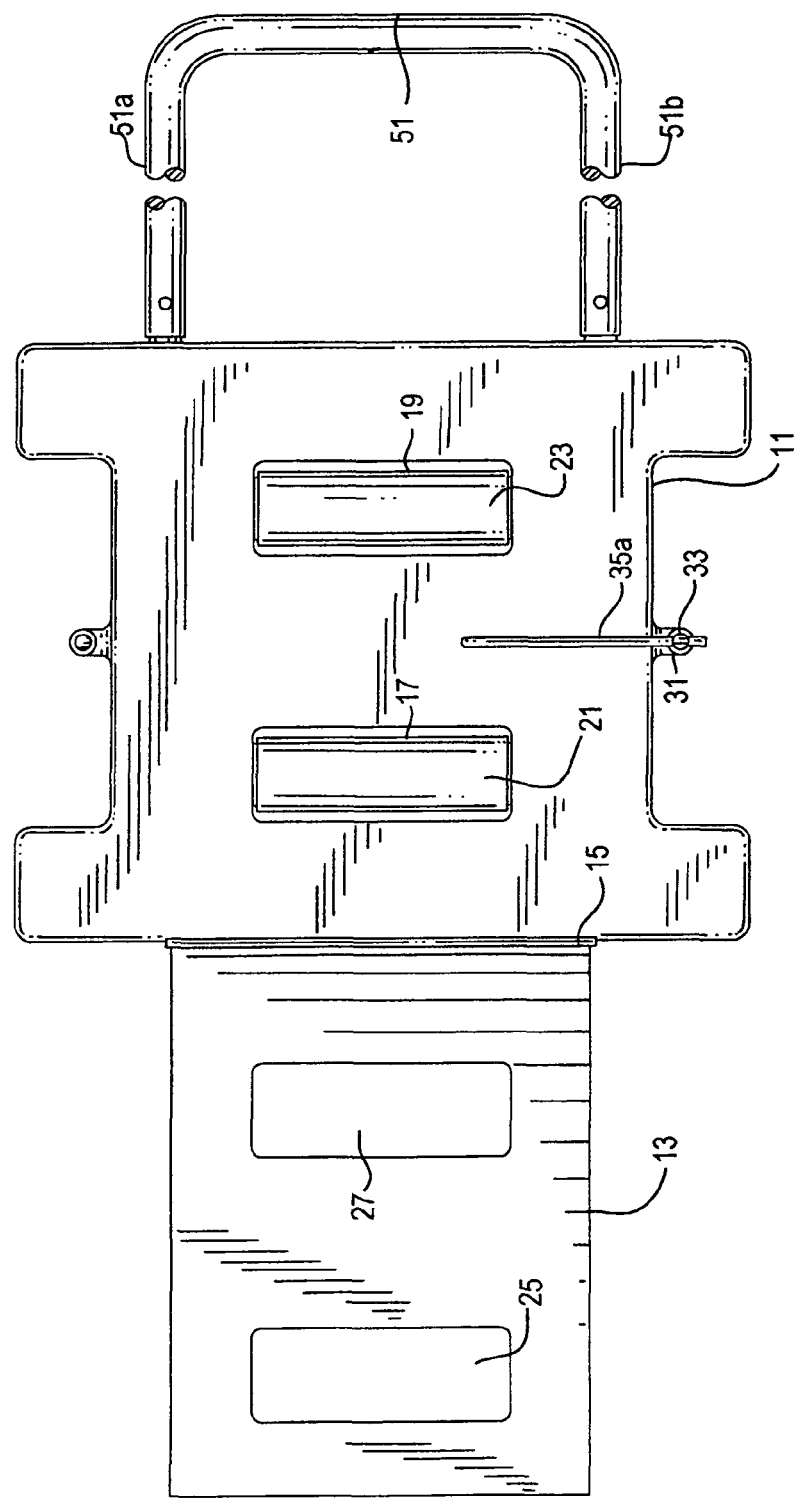
FIG. 1 is a top plan view of the apparatus of this invention showing a tire table and inclined plate hingedly attached to the tire table.
Figure 2:
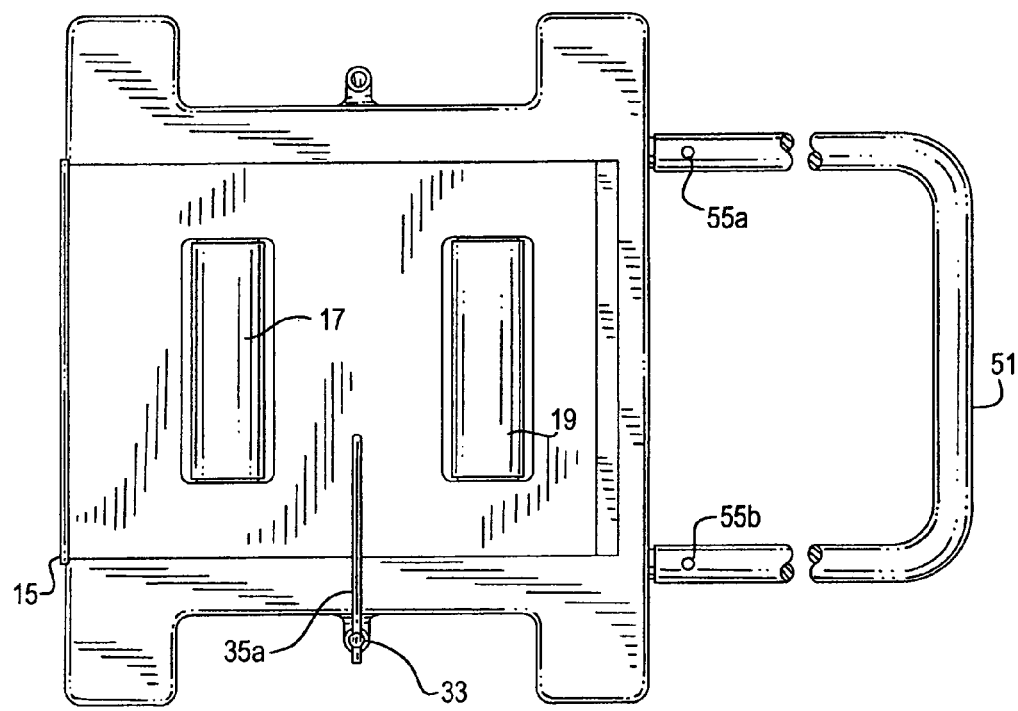
FIG. 2 is a top plan view similar to FIG. 1 wherein the inclined plate is rotated on top of the tire table.

Referring first to FIGS. 1 and 2 of the drawings, there are shown a tire table 11 generally in rectangular or square shape made from a suitable durable plastic, or a metal such as aluminum, and an incline plate 13 hingedly connected to one side of the tire table 11 by a hinge 15. The incline plate 13 may also be made from a durable plastic or a metal as the tire table, however, the material used in fabricating the tire table and the incline plate are not per se critical so long as they can withstand the weight of the tire. Also, the dimensions of the tire table 11 and the incline plate 13 may vary depending on the size of the tire.

Formed in the middle of the tire table 11 are a pair of spaced apart generally parallel slots 17 and 19 each of which accommodate a lug alignment roller such as the lug alignment rollers 21 and 23. The ends of each roller has a central protruding member such as 21*a*, 21*b*, 23*a*, 23*b* (see FIG. 9), each of which fits in a corresponding notch, respectively (not shown). As shown in FIG. 1 the incline plate 13 also has a pair of spaced apart generally parallel slots 25 and 27 sized and shaped so that when the incline plate 13 is rolled onto the tire table 11 the rollers 21, 23 will be slightly exposed above the tire table 11 in order to support the tire.

Figure 3:
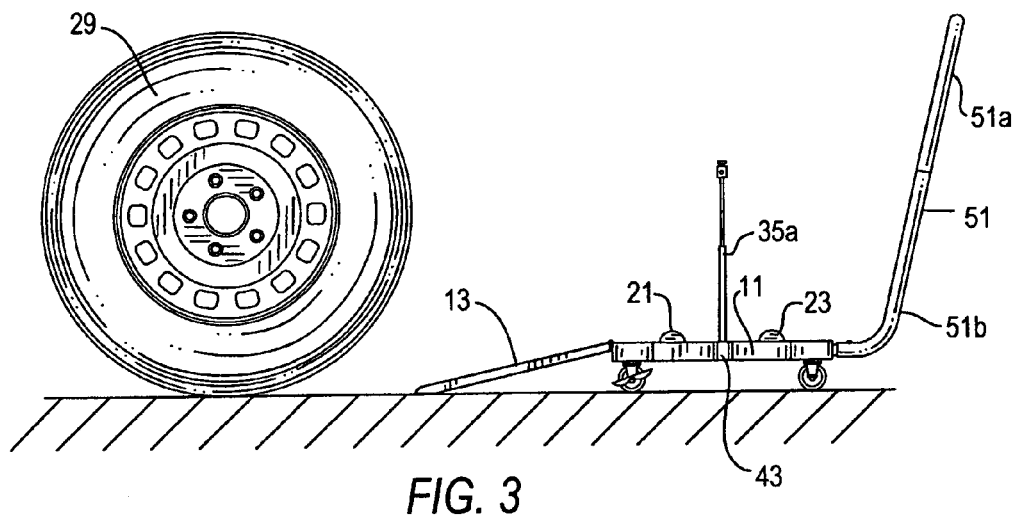
FIG. 3 is a side view of the apparatus shown in FIG. 1 showing a tire ready to be rolled onto the inclined plate.
Figure 4:
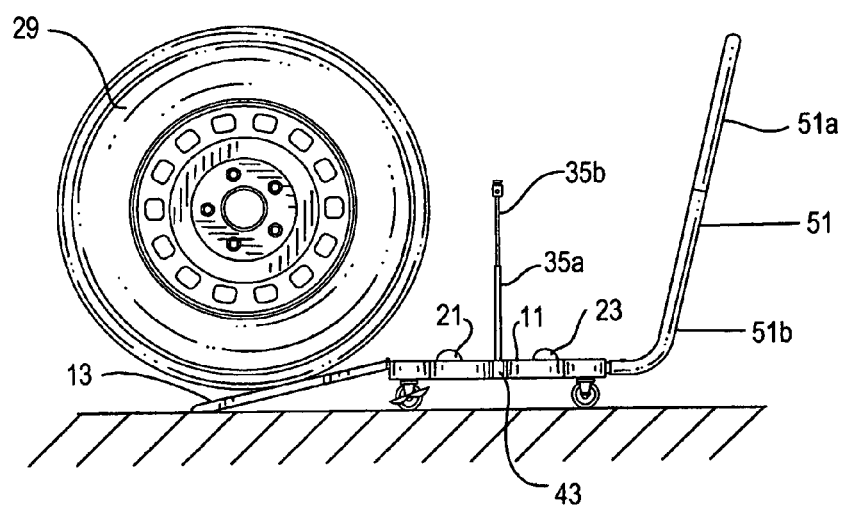
FIG. 4 is a side view similar to FIG. 3 showing the tire rolled up partly on the inclined plate.
Figure 5:
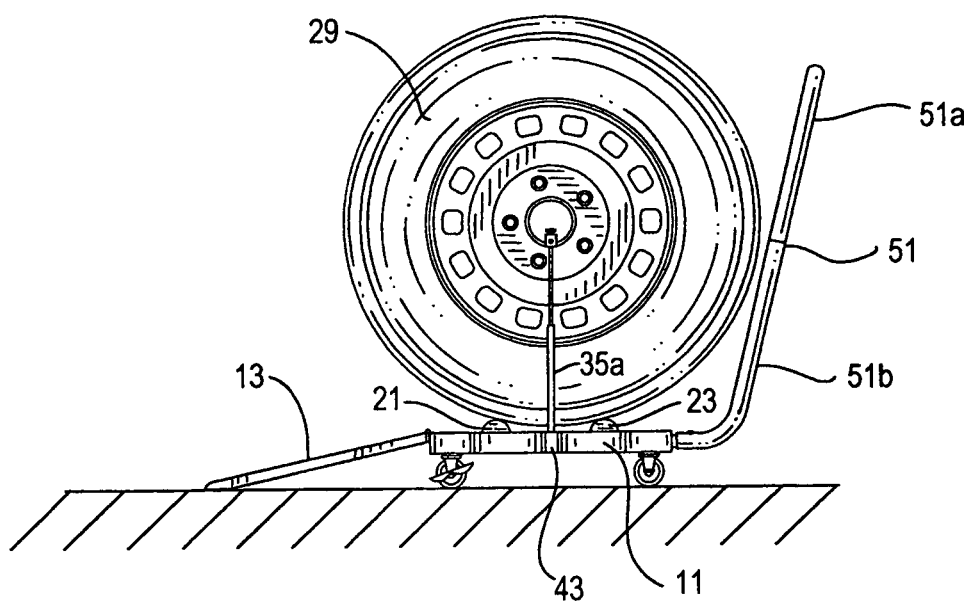
FIG. 5 is a side view similar to FIG. 4 showing the tire in secured position on the tire table ready to be changed.
Figure 6:
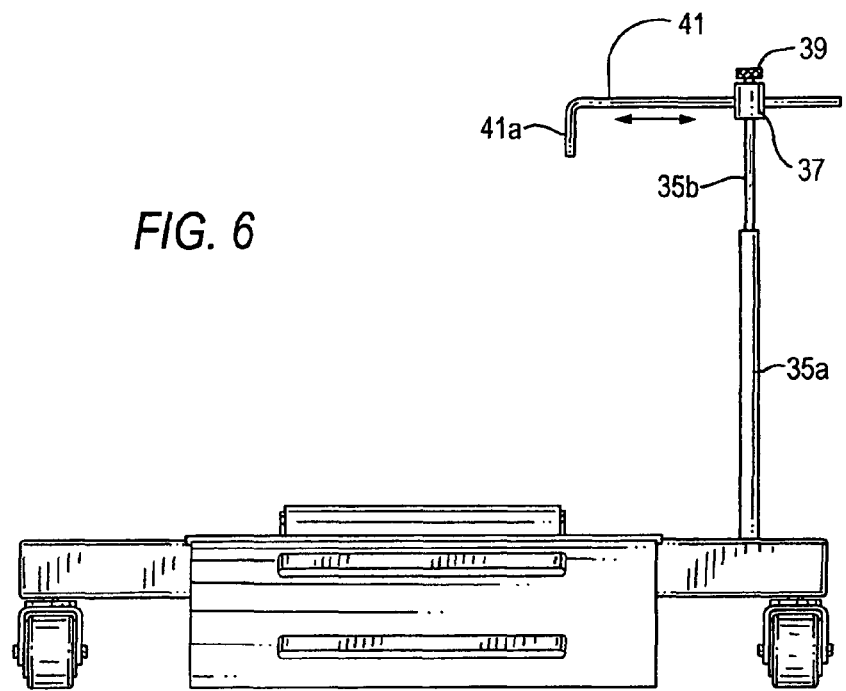
FIG. 6 is a front view of the apparatus shown in FIG. 1 with the inclined plate in downward position.
Figure 7:
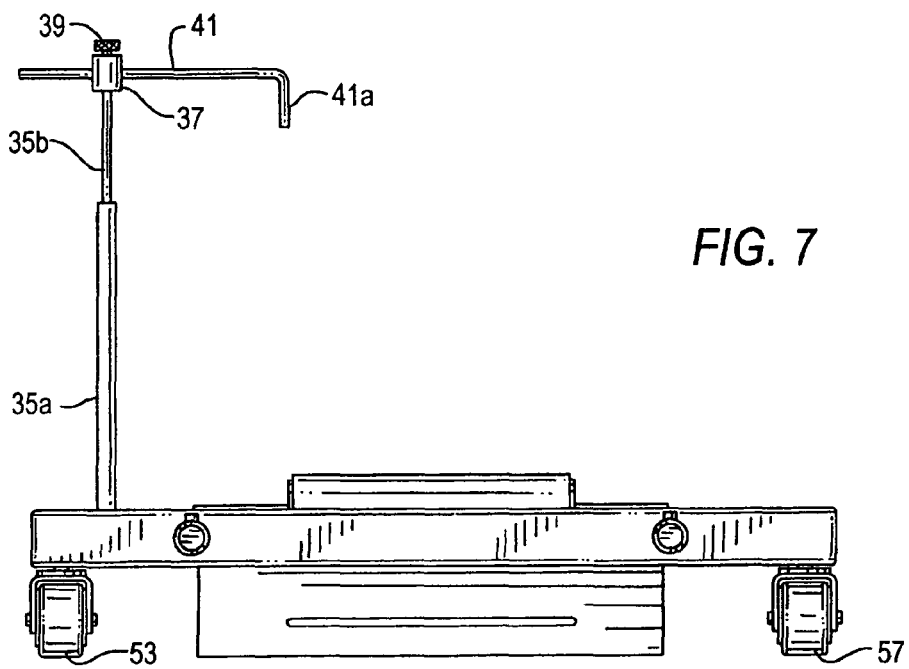
FIG. 7 is a rear view of the apparatus shown in FIG. 1 with the inclined plate in downward position.
Figure 8:
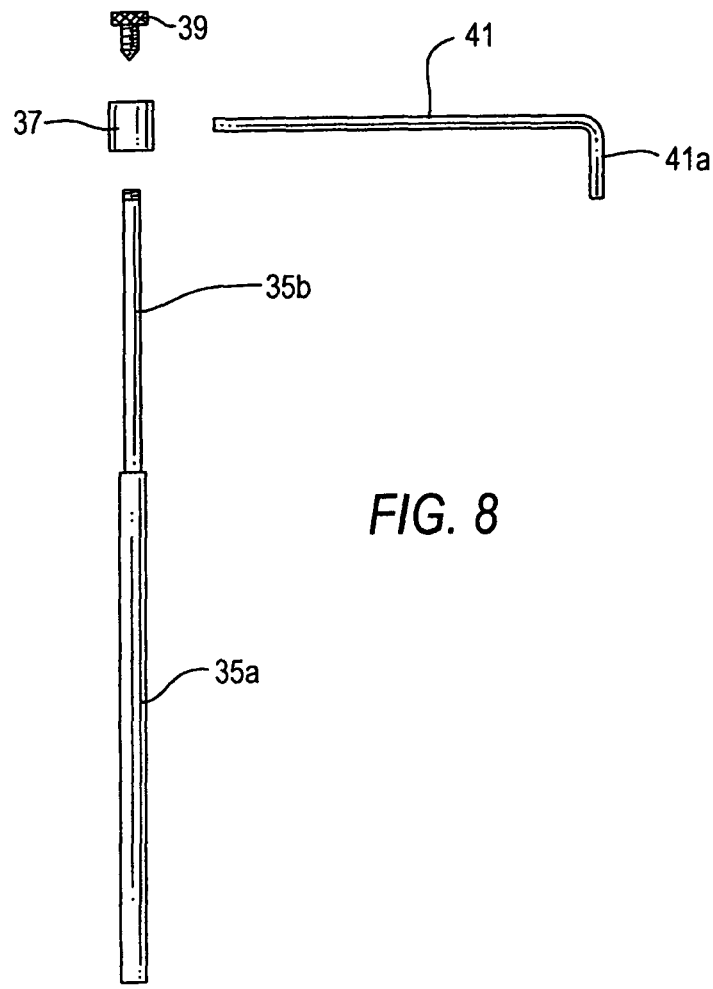
FIG. 8 is an exploded view of the telescoping rim capture rod shown in FIG. 1.

Referring to FIGS. 3, 4 and 5, it can be seen that a tire 29 is placed on the ground near the lower end of the incline plate 13 to be rolled up the incline plate as shown in FIG. 4, and is rolled up further to its resting position on the lug rollers 21, 23 as shown in FIG. 5, and is secured at that position as hereinafter described. Midway on the side of the tire table 11 is a small hollow cylindrical members 31 protruding from the side of the tire table and having central opening 33 formed in said member 31 which serve to receive and retain a telescoping rim capture rod member 35 on one side or the opposite side of the tire table 11 as may be desired. As shown in FIGS. 5, 6, and 7, and in an exploded view in FIG. 8, the telescoping rim capture rod 35 has two sections, a lower section 35a which receives an upper section 35b which terminates in a rim capture hook set screw fitting 37, a set screw 39 and an adjustable rim capture hook 41. The telescoping capture rod 35a sits tightly within rim capture rod base fitting 43 in the tire tray. The height of the telescoping capture rod base 35a may be adjusted by raising or lowering the upper telescoping capture rod member 35b within the lower telescoping member 35a depending on the size (height) of the tire. The adjustable rim capture hook 41 extend laterally above the tire and terminates in the hook 41a designed to retain the tire on the lug rollers 21,23.

In one embodiment as shown in FIGS. 1, 3, 4 and 5, the tire table 11 is connected to a telescoping handle 51 which may be formed in sections such as upper sections 51a and a lower section 51b. The lower end of telescoping section is attached to the end of the tire table 11. When the telescoping handle 51 is attached to the tire table 11, the tire table may be turned left or right and moved forward or backward and, to this end, the tire table 11 is provided with a pair of rotating locking casters 53,55 and a pair of non-locking rotating casters 57,59 as hereinbefore described.

Figure 9:
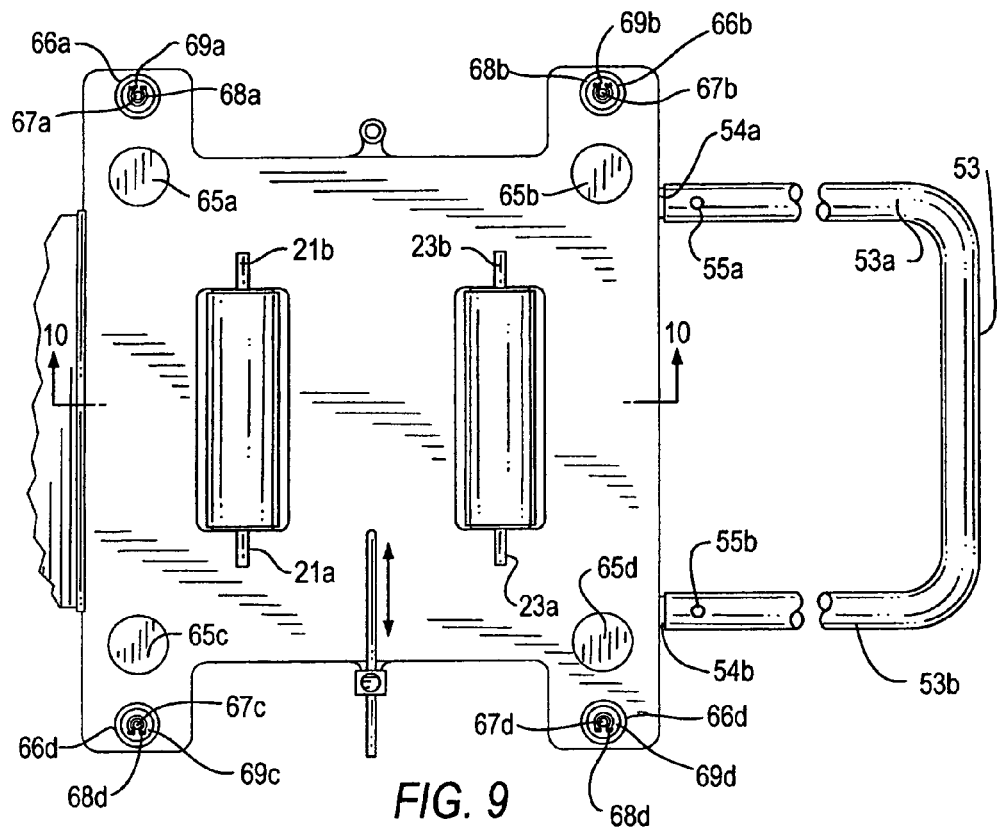
FIG. 9 is a top plan view of the tire table with attached handles.
Figure 10:
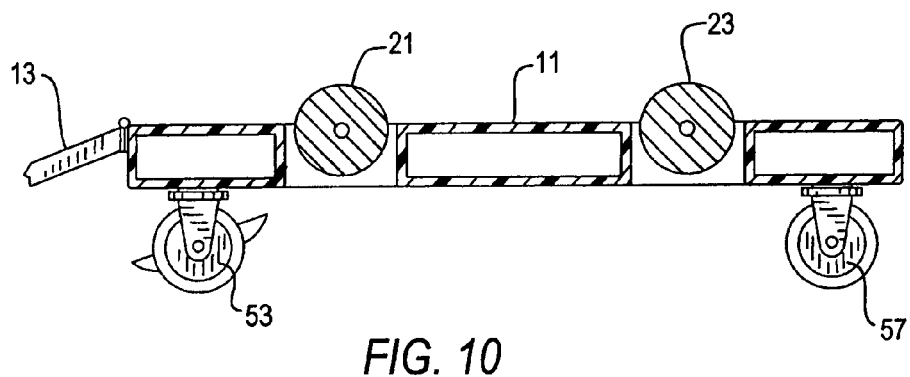
FIG. 10 is a cross-sectional view taken along the lines 9-9—in FIG. 9.

In another embodiment of the invention as shown in FIGS. 1, 2 and 9, the device of this invention is provided with a telescoping handle 53 with its ends 53a,53b attached to the tire table 11 as in 54a,54b and released from the tire table by the release buttons 55a,55b (see FIG. 9).

In order to facilitate using the apparatus of this invention in dark or poorly illuminated surroundings, the tire table 11 may be provided at its corner with lights such as battery operated lights 65a, 65b, 65c and 65d. At its four corners adjacent the battery operated lights the tire table 11 is provided under each corner with a castor mounting recesses 66a, 66b, 66c and 66d, castor mounting posts 67a, 67b, 67c and 67d; castor spring clips 68a, 68b, 68c and 68d, and castor mounting washers 69a, 69b, 69c and 69d.

In operation, the damaged tire is first removed and, if necessary, the car is jacked up until the damaged tire clears the two lug alignment rollers 21,23 and the tire is securely centered between these two lug rollers. The telescoping handles are snapped together and their bottom end are attached to one end of the tire table 11 Once the damaged tire is secured between the lug alignment rollers 21,23 the tire lug nuts are removed, the damaged tire is pulled away from the wheel, the tire is rested on the tire table between the lug alignment rollers. The damaged tire is then removed from the wheel, the tire is rested on the tire table and rolled down the incline table 13 to storage.

Next, the telescoping rim capture rod 35 is fitted into the rim capture base fitting 43 on the tire table, then manually pull the damaged tire to a vertical position, adjust the telescoping capture rod 35 until the rim capture hook 41 is extended through the rim center hole. Push the telescoping capture rod 35 down until shaft 41 of the hook contacts the bottom of the rim center hole then pull the rim capture rod 35 back until the hook 41a contacts the rim center capture hook set screw 16. After the damaged tire is moved to its storage area, it is disconnected from the rip capture hook 41 and rolled down the incline table 13.

The replacement tire 29 is next placed near the lower end of the incline plate 13, the locking rotating casters are locked in position and the replacement tire is rolled up the incline plate 13 onto the tire table 11 until the replacement tire is securely seated between the lug alignment rollers 21,23 (see FIG. 5).

Attached to the underside of the tire table 11 are a pair of locking rotating casters 28,30 which act as a brake and prevent movement of the tire table when the replacement tire is rolled up the incline plate 13 onto the tire table 11 to be positioned between the top of the lug alignment rollers 21,23. Also, as shown in FIG. 7, a pair of non-locking rotating casters 32,34 are mounted on the opposed side of the tire table 11. The locking rotating casters 28,30 and the non-locking rotating casters 32,34 are of post type and held in place spinning slips attached through holes in the tire table 11.

Figure 11:
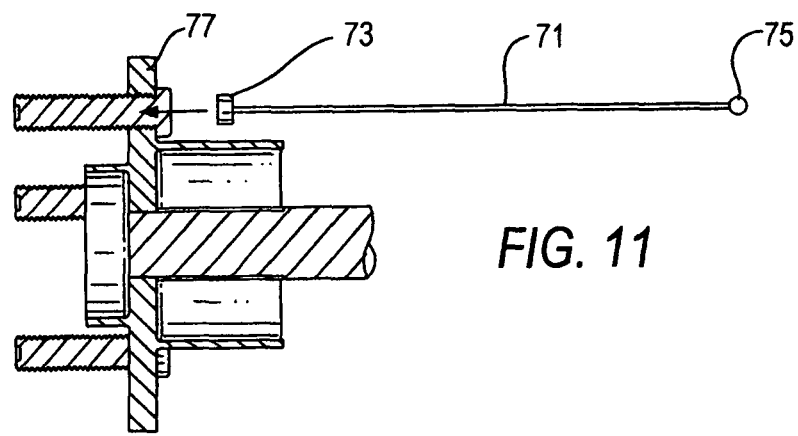
FIG. 11 is a side view of the guide tube used to securely guide the wheel lug nut hole into place on the lug nut stud.

As previously mentioned, the apparatus of this invention also includes a rim capturing device using telescopic rim capture rod 35 formed in two telescoping sections, a lower section 35a sealed in rim capture rod base fitting 43 formed in the tire table 11 as shown in FIG. 5 and an upper section 35b having a rim capture hook 41. The height of the telescopic rim capture rod 35 is adjustable to align the rim capture hook 41a vertically with the center hole of the tire. With the tire 29 in secured position, a guide tube 71 (see FIG. 11) having a magnetic head 73 and a spherical end 75 is used to securely guide the wheel lug nut hole in place on the lug nut stud 77.

The invention claimed is:

1. A tire changing device comprising, in combination:
   a tire support tray having a generally square or rectangular shape having a pair of adjacent, spaced apart parallel slots in the middle of said tray and having a rotating cylindrical roller in each of said slots;
   an incline plate member hingedly connected to said tire support tray having two adjacent, spaced apart parallel slots such that when said incline plate is hingedly rotated and rolled onto said tire support tray, said two slots in said incline plate mate with said two slots in said tire support tray with said rollers being partly exposed above the tire support tray;
   means for moving a tire on said incline tray and positioning said tire between said rollers on said tire support tray,
   means for securing said tire between said two rollers on said tire support tray; and
   means for securing lug nuts of said tire, before rolling said tire away from said support tray down said incline plate.

2. A tire changing device as in claim 1 further including a handle attached to one end of said tire support tray for moving said tire support tray.

3. A tire changing device as in claim 2 wherein said handle comprises an upper member and a lower member, each member being attached to an end of said tire support tray.

4. A tire changing apparatus as in claim 1 further including a telescopic rim capture rod having a lower member attached to said support tray and an upper member terminating in a hook member for securing said tire.

5. A tire changing apparatus as in claim 2 further including a telescopic rim capture rod having a lower member attached to said support tray and an upper member terminating in a hook member for securing said tire.

6. A tire changing apparatus as in claim 3 further including a telescopic rim capture rod having a lower member attached to said support tray and an upper member terminating in a hook member for securing said tire.

7. A tire changing apparatus as in claim 4 wherein said upper member is telescopically received within said lower member.

8. A tire changing apparatus as in claim 5 wherein said upper member is telescopically received within said lower member.

9. A tire changing apparatus as in claim 6 wherein said upper member is telescopically received within said lower member.

* * * * *